(12) United States Patent
Kuzusako et al.

(10) Patent No.: US 8,348,655 B2
(45) Date of Patent: Jan. 8, 2013

(54) OPTICAL MOLDING APPARATUS, OPTICAL MOLDING METHOD, AND OPTICALLY MOLDED PRODUCT

(75) Inventors: Junichi Kuzusako, Saitama (JP);
Nobuhiro Kihara, Kanagawa (JP);
Katsuhisa Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 12/348,969

(22) Filed: Jan. 6, 2009

(65) Prior Publication Data

US 2009/0175977 A1    Jul. 9, 2009

(30) Foreign Application Priority Data

Jan. 9, 2008    (JP) .................. 2008-001852

(51) Int. Cl.
*B29C 35/08* (2006.01)
*G06F 17/50* (2006.01)
(52) U.S. Cl. .............. 425/174.4; 264/401; 264/412; 264/494; 700/98; 700/120
(58) Field of Classification Search .......... 425/174.4, 425/470; 264/308, 401, 407, 410, 412, 480, 264/481, 494–496; 700/98, 118–120, 129, 700/204
See application file for complete search history.

(56) References Cited

U.S. PATENT DOCUMENTS

| | | | | |
|---|---|---|---|---|
| 4,961,154 A | * | 10/1990 | Pomerantz et al. | 345/419 |
| 5,014,207 A | * | 5/1991 | Lawton | 700/120 |
| 5,137,662 A | * | 8/1992 | Hull et al. | 264/401 |
| 5,429,908 A | * | 7/1995 | Hokuf et al. | 430/269 |
| 5,711,911 A | * | 1/1998 | Hull | 264/401 |
| 5,766,647 A | * | 6/1998 | Kuzusako | 425/84 |
| 5,820,811 A | * | 10/1998 | Murakami et al. | 264/401 |
| 6,036,911 A | * | 3/2000 | Allison et al. | 264/401 |
| 6,051,179 A | * | 4/2000 | Hagenau | 264/401 |
| 6,180,050 B1 | * | 1/2001 | Arai et al. | 264/401 |
| 6,207,097 B1 | * | 3/2001 | Iverson | 264/401 |
| 6,399,010 B1 | * | 6/2002 | Guertin et al. | 264/401 |
| 6,406,658 B1 | * | 6/2002 | Manners et al. | 264/401 |

(Continued)

FOREIGN PATENT DOCUMENTS

EP    0 376 571 A2 * 12/1989

(Continued)

OTHER PUBLICATIONS

Japanese Office Action issued on Jul. 10, 2012, in connection with counterpart JP Application No. 2008-001852.

*Primary Examiner* — Dimple Bodawala
(74) *Attorney, Agent, or Firm* — SNR Denton US LLP

(57) ABSTRACT

An optical molding apparatus molds an optically molded product by stacking cured layers. Each cured layer is formed by emitting light according to cross-sectional-shape data of the optically molded product onto a surface of photo-curable resin. The optical molding apparatus includes an exposing unit and an exposure control unit. The exposing unit performs exposure on the photo-curable resin for each of small work areas that are defined by dividing an overall work area, which is where an optical molding operation is performed, into a plurality of areas. The exposure control unit controls an exposure condition of the exposing unit for each of the small work areas and allows the exposure to be performed collectively on multiple layers' worth of the photo-curable resin in a predetermined one of the small work areas.

4 Claims, 6 Drawing Sheets

U.S. PATENT DOCUMENTS

| | | | |
|---|---|---|---|
| 6,833,234 B1 * | 12/2004 | Bloomstein et al. | 430/321 |
| 7,083,405 B2 * | 8/2006 | Koyagi et al. | 425/174.4 |
| 7,670,541 B2 * | 3/2010 | Kuzusako et al. | 264/401 |
| 2001/0048184 A1 * | 12/2001 | Ueno | 264/401 |
| 2005/0179772 A1 * | 8/2005 | Ishikawa et al. | 347/255 |
| 2006/0145381 A1 * | 7/2006 | Larsson | 264/40.6 |
| 2008/0038396 A1 * | 2/2008 | John et al. | 425/174.4 |
| 2008/0157412 A1 * | 7/2008 | Kihara et al. | 264/1.1 |
| 2008/0169587 A1 * | 7/2008 | Kihara et al. | 264/408 |
| 2009/0140466 A1 * | 6/2009 | Kuzusako et al. | 264/406 |
| 2009/0142436 A1 * | 6/2009 | Kuzusako et al. | 425/174.4 |
| 2011/0101570 A1 * | 5/2011 | John et al. | 264/401 |

FOREIGN PATENT DOCUMENTS

| | | |
|---|---|---|
| JP | 61-116321 | 6/1986 |
| JP | 05-077323 | 3/1993 |
| WO | 2006/035739 | 4/2006 |

* cited by examiner

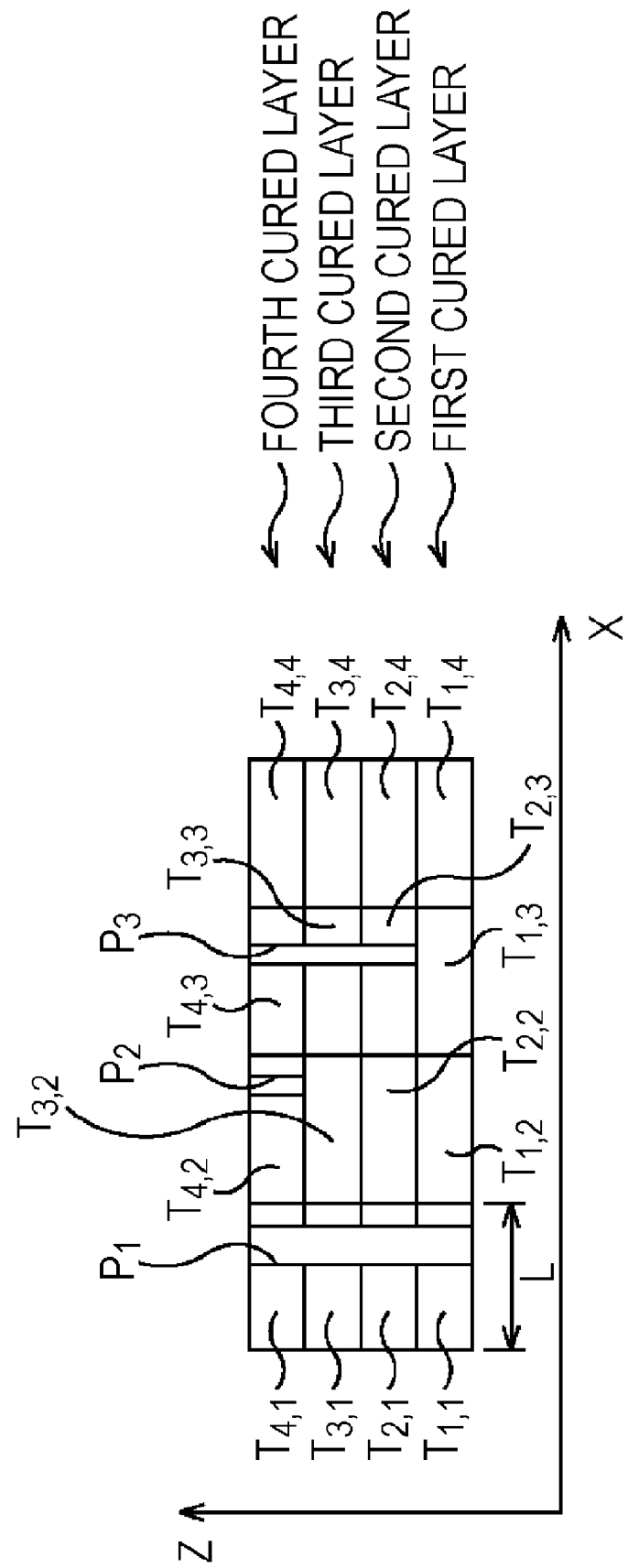

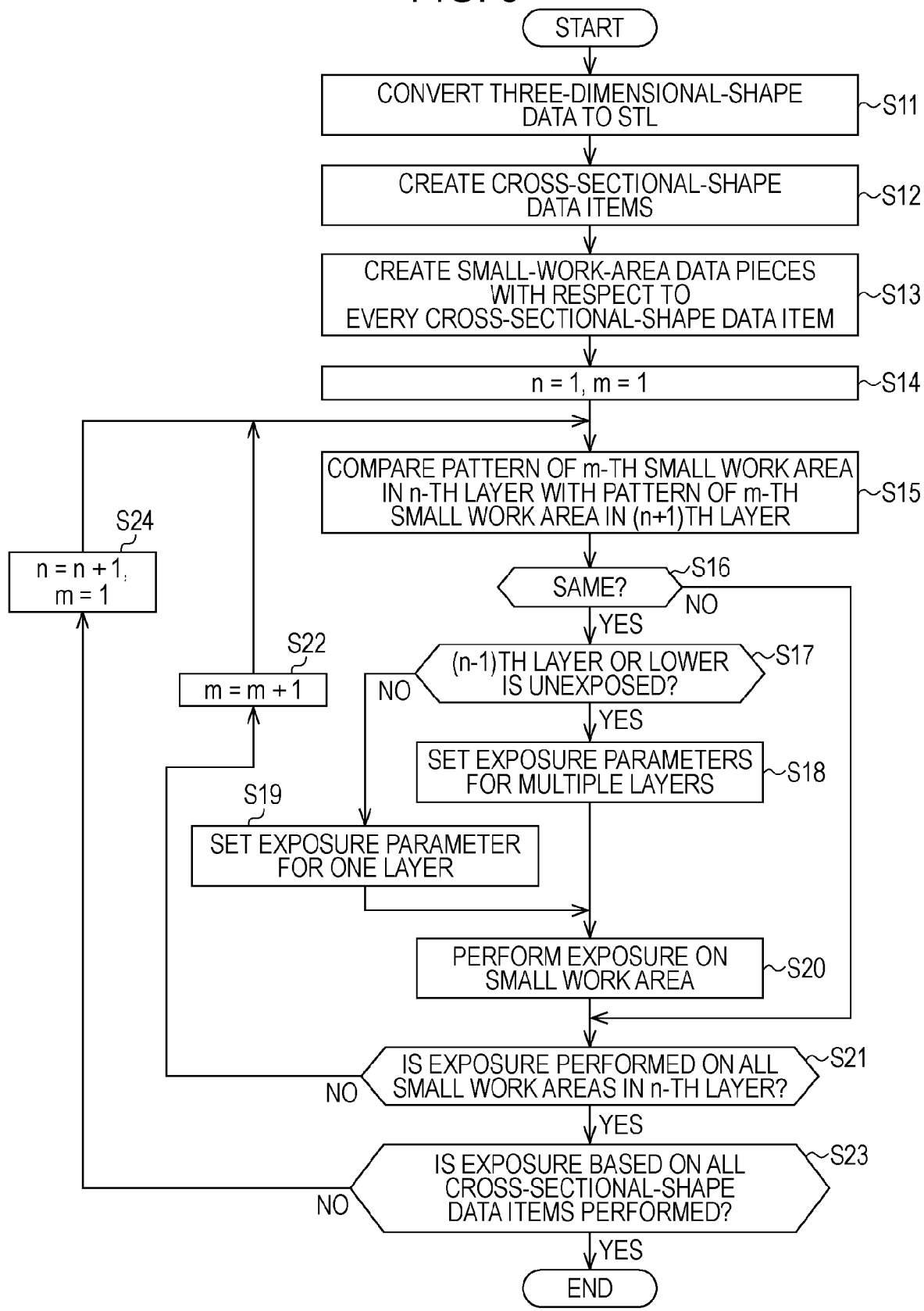

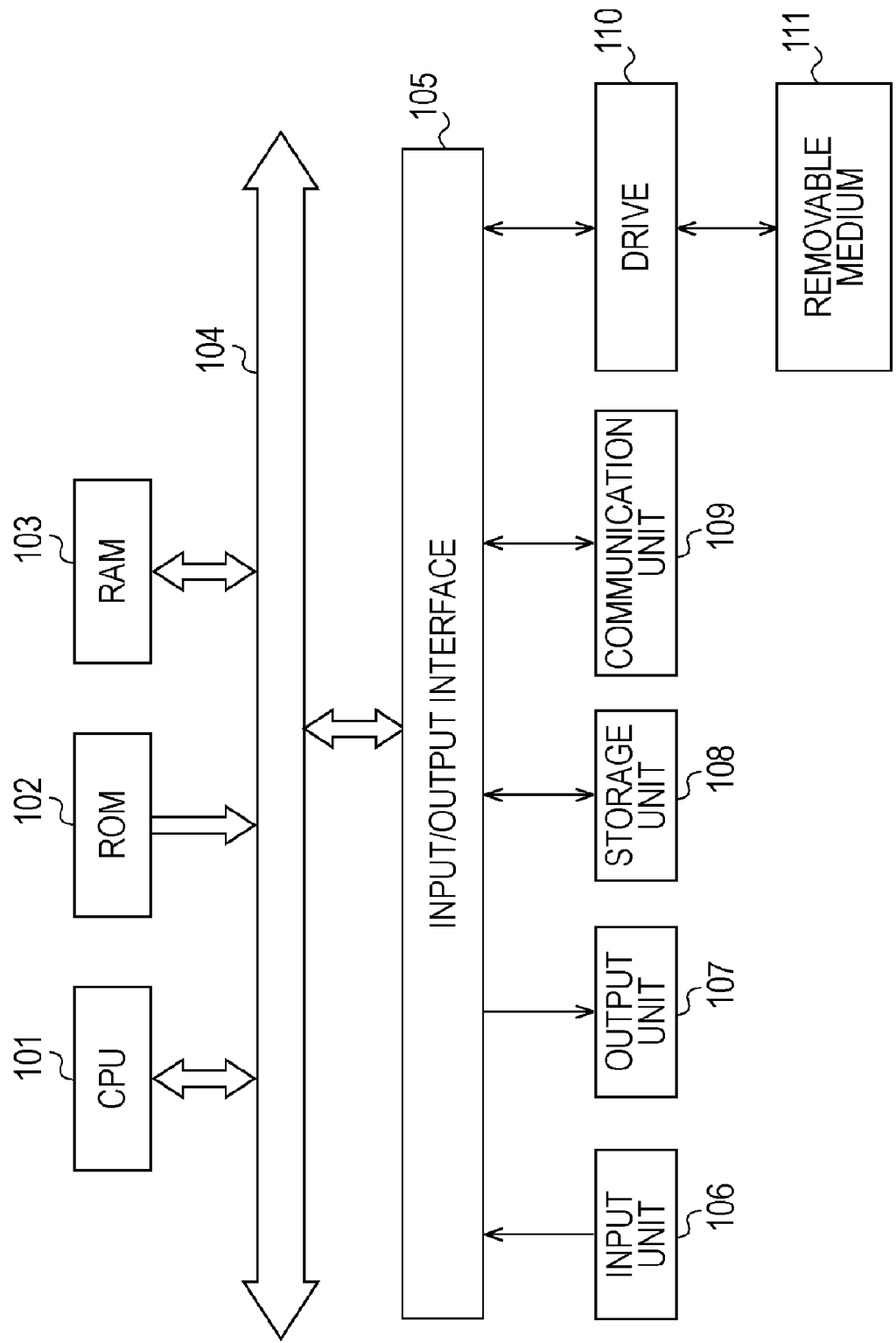

OPTICAL MOLDING APPARATUS, OPTICAL MOLDING METHOD, AND OPTICALLY MOLDED PRODUCT

CROSS REFERENCES TO RELATED APPLICATIONS

The present invention contains subject matter related to Japanese Patent Application JP 2008-001852 filed in the Japanese Patent Office on Jan. 9, 2008, the entire contents of which are incorporated herein by reference.

BACKGROUND OF THE INVENTION

1. Field of the Invention

The present invention relates to optical molding apparatuses, optical molding methods, and optically molded products. In particular, the present invention relates to an optical molding apparatus and an optical molding method that can shorten the time necessary for molding a high-precision molded product, and to an optically molded product that can be molded in a shorter time.

2. Description of the Related Art

In related art, when a three-dimensional model (molded product) is to be formed using three-dimensional-shape data created by computer aided design (CAD), a numerically-controlled machining device, for example, is used, which means that the three-dimensional model is formed by machining.

In recent years, a method called rapid prototyping (RP) used for forming a three-dimensional model without machining has been attracting attention at many production sites. In rapid prototyping, a manufacturing technique called a lamination-molding technique is employed. In this technique, a three-dimensional model is formed by creating thin sheets defining cross-sectional shapes of the three-dimensional model, which are thin slices of the three-dimensional model, on the basis of three-dimensional-shape data of the three-dimensional model, and then stacking the thin sheets defining the cross-sectional shapes one on top of the other.

Rapid prototyping can be classified into the following methods depending on how the thin sheets defining the cross-sectional shapes are created: an optical molding method that employs ultraviolet curable resin, a fused deposition modeling (FDM) method in which layers of thermoplastic resin are laminated by extrusion, a selective laser sintering (SLS) method in which layers are laminated by melting and adhering a powder material, a laminated object manufacturing (LOM) method in which thin sheets of paper are laminated, and an ink-jet method in which powder or curing catalyst is emitted to form a laminate.

For example, in the optical molding method, three-dimensional-shape data of a three-dimensional model created by CAD is converted to stereo lithography (STL) which is a format that expresses the surface of the three-dimensional model with small triangular surfaces. The STL is then received by an optical molding apparatus.

From the three-dimensional-shape data, the optical molding apparatus creates cross-sectional-shape data items, which are obtained by slicing the three-dimensional model at a fixed interval of, for example, about 0.1 mm to 0.2 mm. Based on each cross-sectional-shape data item, the optical molding apparatus determines an exposure range to which light is to be emitted on the surface of photo-curable resin in the liquid state. For each layer corresponding to one cross-sectional-shape data item, the optical molding apparatus emits light according to the cross-sectional-shape data item to the exposure range on the surface of the liquid photo-curable resin, and shifts a shiftable stage disposed in the liquid photo-curable resin downward in an orthogonal direction in accordance with the thickness of each slice of the three-dimensional model. Then, the optical molding apparatus repeats the light emission process and the shifting process of the shiftable stage from the cross-sectional-shape data item for the lowermost layer to the cross-sectional-shape data item for the uppermost layer, thereby forming the three-dimensional model.

Methods for emitting light to the surface of the photo-curable resin in the optical molding apparatus include a beam-scanning method performed by scanning a light beam, a spatial-light-modulator (SLM) projecting method performed by emitting light collectively using a spatial light modulator, such as a liquid crystal panel, and a method with the combination of the beam-scanning method and the SLM projecting method.

In the method with the combination of the beam-scanning method and the SLM projecting method, light is emitted collectively to the exposure range on the surface of the photo-curable resin by using the spatial light modulator, and a light beam is scanned along the contour of each cross-sectional-shape data item, whereby a three-dimensional model with a clear contour can be molded.

Japanese Unexamined Patent Application Publication No. 5-77323 discloses an optical molding apparatus that can adjust the distance between the surface of the photo-curable resin and a mirror, which is used for scanning a light beam, in accordance with the size of the three-dimensional model.

SUMMARY OF THE INVENTION

Although an optical molding apparatus has the above-described configuration, it is desirable to shorten the time necessary for molding a high-precision molded product, as compared to the related art.

Therefore, it is desirable to provide an optical molding apparatus and an optical molding method that can shorten the time necessary for molding a high-precision molded product, and to provide an optically molded product that can be molded in a shorter time.

According to an embodiment of the present invention, there is provided an optical molding apparatus that molds an optically molded product by stacking cured layers. Each cured layer is formed by emitting light according to cross-sectional-shape data of the optically molded product onto a surface of photo-curable resin. The optical molding apparatus includes an exposing unit and an exposure control unit. The exposing unit performs exposure on the photo-curable resin for each of small work areas that are defined by dividing an overall work area, which is where an optical molding operation is performed, into a plurality of areas. The exposure control unit controls an exposure condition of the exposing unit for each of the small work areas and allows the exposure to be performed collectively on multiple layers' worth of the photo-curable resin in a predetermined one of the small work areas.

According to an embodiment of the present invention, there is provided an optical molding method for molding an optically molded product by stacking cured layers. Each cured layer is formed by emitting light according to cross-sectional-shape data of the optically molded product onto a surface of photo-curable resin. The method includes the steps of performing exposure on the photo-curable resin for each of small work areas that are defined by dividing an overall work area, which is where an optical molding operation is performed, into a plurality of areas, and controlling an exposure condition for each of the small work areas and allowing the exposure to be performed collectively on multiple layers' worth of the photo-curable resin in a predetermined one of the small work areas.

According to an embodiment of the present invention, there is provided an optically molded product molded by stacking cured layers. Each cured layer is formed by emitting light according to cross-sectional-shape data onto a surface of photo-curable resin. The optically molded product is molded by performing exposure on the photo-curable resin for each of small work areas that are defined by dividing an overall work area, which is where an optical molding operation is performed, into a plurality of areas. An exposure condition is controlled for each of the small work areas and the exposure is performed collectively on multiple layers' worth of the photo-curable resin in a predetermined one of the small work areas.

In these embodiments of the present invention, the exposure is performed on the photo-curable resin for each of the small work areas that are defined by dividing the overall work area, which is where the optical molding operation is performed, into a plurality of areas. The exposure condition is controlled for each of the small work areas and the exposure is performed collectively on multiple layers' worth of the photo-curable resin in a predetermined one of the small work areas.

According to the embodiments of the present invention, the time necessary for molding a high-precision molded product can be shortened.

BRIEF DESCRIPTION OF THE DRAWINGS

FIG. 4 illustrates an example of a three-dimensional model molded by performing exposure collectively on small work areas having the same patterns;

FIG. 5 is a flow chart illustrating an optical molding process performed by the optical molding apparatus; and FIG. 6 is a block diagram showing a configuration example of a computer.

DESCRIPTION OF THE PREFERRED EMBODIMENTS

An exemplary embodiment of the present invention will be described in detail below with reference to the drawings.

First, a tiling method, which is an optical molding method performed by an optical molding apparatus according to the embodiment of the present invention, will be described with reference to FIGS. 1A and 1B.

Generally, in optical molding, the contour of a three-dimensional model can be formed with high accuracy by reducing a scanning range of a light beam or by reducing a range to which light is to be emitted using a spatial light modulator. This can enhance the dimensional accuracy of the three-dimensional model. For example, a tiling method has been proposed, in which an overall work area where an optical molding operation is to be performed is divided into multiple small work areas. In this tiling method, one-shot exposure and beam scanning are performed on each of the small work areas.

Figure 1A:
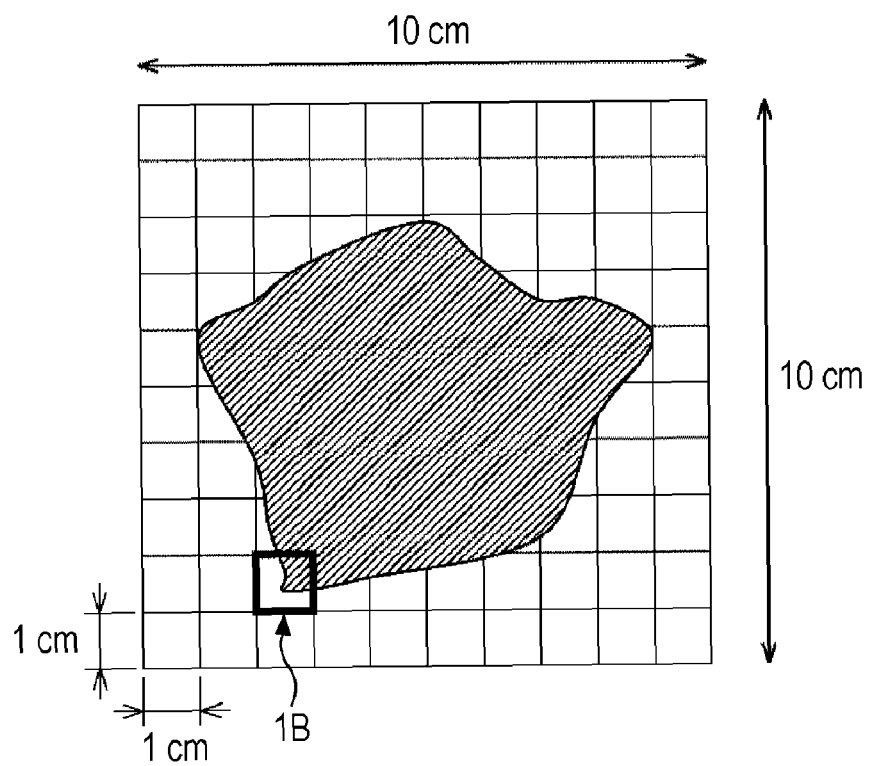
FIGS. 1A and 1B illustrate a tiling method.
Figure 1B:
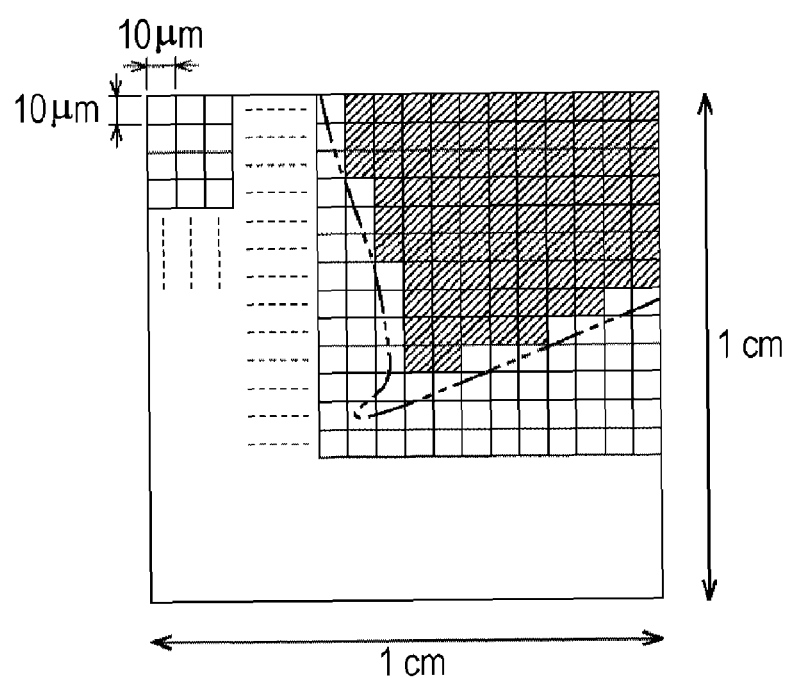

FIG. 1A shows the overall work area, whereas FIG. 1B shows one of the small work areas, which is part of the overall work area.

In FIGS. 1A and 1B, the overall work area has vertical and horizontal dimensions of 10 cm×10 cm, and each small work area has vertical and horizontal dimensions of 1 cm×1 cm. This implies that the overall work area is divided into 10×10 small work areas in the vertical and horizontal directions.

As shown in FIG. 1A, a shaded region near the center of the overall work area is an exposure range according to cross-sectional-shape data of the three-dimensional model. FIG. 1B is an enlarged view of a small work area located on the second row from the bottom and the third column from the left of the overall work area.

Supposing that a spatial light modulator with a matrix of 1000 pixels by 1000 pixels is used for the one-shot exposure, the small work area shown in FIG. 1B is divided into 1000 by 1000 unit areas in accordance with the pixels of the spatial light modulator. Specifically, each unit area corresponds to one pixel of the spatial light modulator. Since the small work area has vertical and horizontal dimensions of 1 cm×1 cm, each unit area has vertical and horizontal dimensions of 10 μm×10 μm.

In FIG. 1B, the contour of the cross-sectional-shape data is indicated by a double-dotted chain line, and the unit areas to be exposed to light by one-shot exposure are shown as shaded unit areas. In other words, in one-shot exposure, the unit areas located within the contour are subjected to exposure, whereas the unit areas overlapping the contour of the cross-sectional-shape data and the unit areas located outside of the contour of the cross-sectional-shape data are not subjected to exposure.

After the one-shot exposure, beam scanning is performed along the inner side of the contour of the cross-sectional-shape data, and exposure is performed on areas that are located within the contour and that have not been exposed to light by the one-shot exposure.

In this manner, the exposure is performed on photo-curable resin for each small work area until the small work areas corresponding to one layer are exposed to light, thereby forming one cured layer. Therefore, the total time necessary for forming one cured layer is determined by multiplying the exposure time necessary for performing exposure on one small work area by the number of small work areas corresponding to one layer. Moreover, since the three-dimensional model is molded by stacking multiple cured layers, the total molding time necessary for molding the three-dimensional model is determined by multiplying the time necessary for forming one cured layer by the number of cured layers constituting the three-dimensional model.

For example, the molding time for molding a three-dimensional model will be described with reference to FIG. 2.

Figure 2:
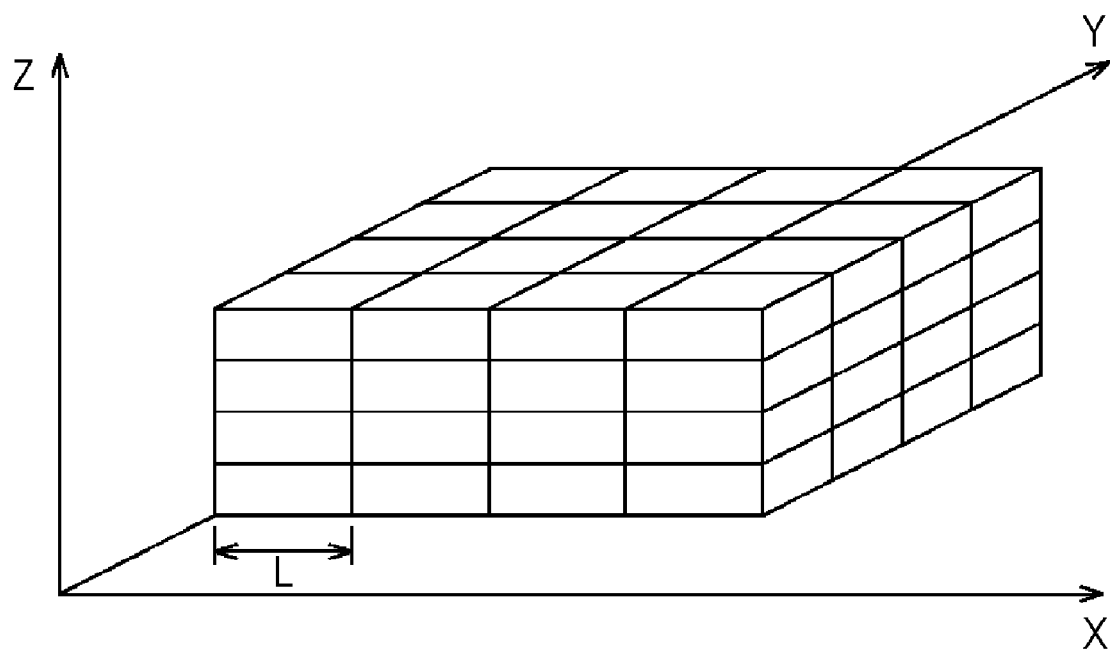
FIG. 2 illustrates a molding time for molding a three-dimensional model.

FIG. 2 is a perspective view of a three-dimensional model.

The three-dimensional model shown in FIG. 2 includes four cured layers that are stacked in Z direction. Each cured layer includes 4×4 (i.e., 16) ultraviolet curable resin segments (which will be referred to as "tiles" hereinafter, where appropriate) arranged in X-Y direction. Each tile is cured as a result of performing exposure on the corresponding small work area and has a size equal to that of the small work area. In other words, the three-dimensional model is formed of 64 tiles that are formed by repeating the exposure on the small work areas 64 times. Accordingly, if the exposure time necessary for forming one tile by performing exposure on one small work area is defined as A, the molding time for molding the three-dimensional model in FIG. 2 is expressed by 64×A.

As mentioned above, with the tiling method, the dimensional accuracy of the three-dimensional model can be enhanced by performing exposure on photo-curable resin for each small work area, although an increase in the number of tiles can lead to an extended molding time of the three-dimensional model.

With the optical molding apparatus according to this embodiment of the present invention, the molding time for molding the three-dimensional model can be shortened.

Figure 3:
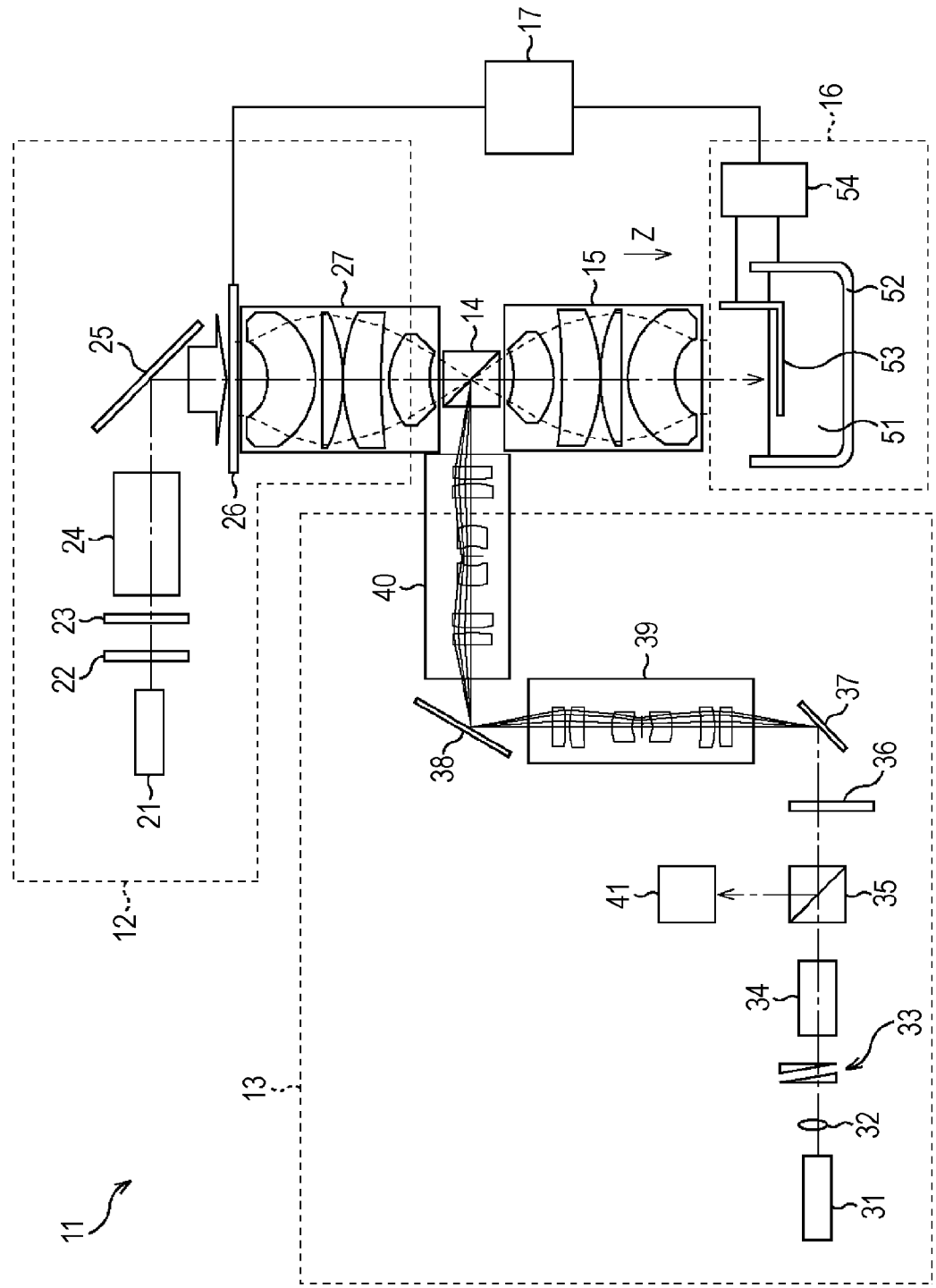
FIG. 3 is a block diagram showing a configuration example of an optical molding apparatus according to an embodiment of the present invention.

FIG. 3 is a block diagram showing a configuration example of the optical molding apparatus according to the embodiment of the present invention.

In FIG. 3, an optical molding apparatus 11 includes a one-shot-exposure optical system 12, a beam-scanning optical system 13, a polarization beam splitter 14, an objective lens 15, a work station 16, and a control unit 17, and is configured to perform optical molding by emitting light (ultraviolet light) towards ultraviolet curable resin 51 acting as photo-curable resin. Of lines indicating that the blocks included in the optical molding apparatus 11 are controlled by the control unit 17, some lines are not shown in FIG. 3 for the purpose of preventing the figure from becoming too complicated.

The one-shot-exposure optical system 12 is configured to perform one-shot exposure in which the surface of the ultraviolet curable resin 51 located in the work station 16 is collectively exposed to light in one shot. The one-shot-exposure optical system 12 includes a light source 21, a shutter 22, a polarizing plate 23, a beam integrator 24, a mirror 25, a spatial light modulator 26, and a focusing lens 27.

The light source 21 may be of a type that has, for example, high-output blue-light-emitting diodes (LEDs) arranged in an array. The light source 21 emits light to be used for performing one-shot exposure. It is not necessary to use a coherent laser light source as the light source 21.

The shutter 22 controls the light emitted from the light source 21 by transmitting or blocking the light in accordance with the control performed by the control unit 17, and also performs ON/OFF control of the exposure process performed by the one-shot-exposure optical system 12.

The polarizing plate 23 polarizes the light passing through the shutter 22 so as to make the light into predetermined polarized light. Specifically, the polarizing plate 23 polarizes the light emitted from the light source 21 so that the spatial light modulator 26 including a transmissive liquid crystal panel can spatially modulate the light.

The beam integrator 24 uniformizes the light polarized by the polarizing plate 23. The beam integrator 24 may be of a common type, such as a fly's eye type constituted by an array of multiple lens elements or a light rod type configured to cause the light to be completely reflected within a rod lens having a columnar shape, e.g., a rectangular columnar shape.

The mirror 25 reflects the light uniformized by the beam integrator 24 towards the spatial light modulator 26.

The spatial light modulator 26 includes, for example, a transmissive liquid crystal panel and is controlled by the control unit 17 to spatially modulate a portion of the light reflected by the mirror 25 so that an exposure range on the ultraviolet curable resin 51 can be exposed to the light in accordance with the cross-sectional-shape data.

Specifically, the spatial light modulator 26 receives a driving signal, for driving the pixels in the liquid crystal panel, from the control unit 17 in accordance with the cross-sectional-shape data. Based on the driving signal, the spatial light modulator 26 changes the alignment of liquid crystal molecules in the pixels corresponding to the exposure range so as to change the polarization direction of the transmitted light. Consequently, the spatial light modulator 26 spatially modulates the light passing through the liquid crystal panel and projects the light having a shape according to the cross-sectional-shape data to the ultraviolet curable resin 51, such that an area corresponding to each pixel of the liquid crystal panel acts as a unit area subjected to exposure.

The focusing lens 27 includes a lens group for correcting distortion that may occur when the light spatially modulated by the spatial light modulator 26 passes through the objective lens 15. The focusing lens 27 focuses the light spatially modulated by the spatial light modulator 26 onto an anterior focal point of the objective lens 15 located on a reflective-transmissive surface of the polarization beam splitter 14. For example, the lens group of the focusing lens 27 and a lens group of the objective lens 15 are arranged such that the focusing lens 27 and the objective lens 15 are symmetrical optical systems, thereby reducing distortion.

The beam-scanning optical system 13 is configured to perform beam-scanning exposure by scanning a laser beam over the surface of the ultraviolet curable resin 51 in the work station 16. The beam-scanning optical system 13 includes a light source 31, a collimator lens 32, an anamorphic lens 33, a beam expander 34, a beam splitter 35, a shutter 36, galvano mirrors 37 and 38, relay lenses 39 and 40, and a reflective-light monitor unit 41.

The light source 31 includes, for example, a semiconductor laser that emits a laser beam having a relatively short wavelength between about the blue region and the ultraviolet region, and is configured to emit a light beam to be used by the beam-scanning optical system 13 for beam scanning. The light source 31 may be a gas laser as an alternative to the semiconductor laser.

The collimator lens 32 converts the angle of divergence of the light beam emitted from the light source 31 so as to substantially collimate the light beam. The anamorphic lens 33 shapes the elliptical light beam substantially collimated by the collimator lens 32 so as to give the light beam a substantially circular shape.

The beam expander 34 adjusts the beam diameter of the light beam, given the substantially circular shape by the anamorphic lens 33, by converting the beam diameter to a desired beam diameter suitable for, for example, the aperture and the numerical aperture of the objective lens 15.

The beam splitter 35 transmits the light beam emitted from the light source 31 and causes the light beam to travel towards the ultraviolet curable resin 51 in the work station 16. In addition, feedback light reflected by the ultraviolet curable resin 51 and then passing through the individual optical systems is reflected towards the reflective-light monitor unit 41 by the beam splitter 35.

The shutter 36 controls the light beam transmitted through the beam splitter 35 by transmitting or blocking the light beam in accordance with the control performed by the control unit 17, and also performs ON/OFF control of the beam-scanning exposure performed by the beam-scanning optical system 13. In the case where the light source 31 is a semiconductor laser, the ON/OFF control of the beam-scanning exposure may be performed by directly modulating the emission of the light beam in the semiconductor laser. Therefore, in that case, the beam-scanning optical system 13 does not have to be provided with the shutter 36.

The galvano mirrors 37 and 38 each include a reflector that is rotatable in a predetermined direction and an adjuster that adjusts the angle of the reflector in the rotational direction in accordance with an electric signal. The adjuster adjusts the angle of the reflector so that the light beam reflected by the reflector can be scanned in a predetermined direction.

Specifically, the galvano mirror 37 reflects the light beam transmitted through the shutter 36 towards the galvano mirror 38 and causes the light beam to be scanned in a predetermined direction, i.e., X direction, within a plane parallel to the surface, i.e., liquid surface, of the ultraviolet curable resin 51. The galvano mirror 38 reflects the light beam reflected by the galvano mirror 37 towards the polarization beam splitter 14 and causes the light beam to be scanned in Y direction, which is orthogonal to the X direction, within the plane parallel to the surface, i.e., liquid surface, of the ultraviolet curable resin 51.

The relay lenses 39 and 40 each include a lens group having one or more lenses, and emit a collimated incident light beam in a parallel fashion over a scanning angle by which the light beam is scanned by the galvano mirrors 37 and 38. Specifically, the relay lens 39 forms an image of the light beam reflected by the galvano mirror 37 on the galvano mirror 38, and the relay lens 40 forms an image of the light beam reflected by the galvano mirror 38 on the reflective-transmissive surface of the polarization beam splitter 14.

By providing the relay lens 39 between the galvano mirror 37 and the galvano mirror 38 and providing the relay lens 40 between the galvano mirror 38 and the polarization beam splitter 14 in this manner, the image of the light beam can be formed on the reflective-transmissive surface of the polarization beam splitter 14 even if the light beam is scanned by the galvano mirrors 37 and 38 that are not disposed adjacent to each other. Thus, the light beam can be combined with the light from the one-shot-exposure optical system 12.

The reflective-light monitor unit 41 employs, for example, the astigmatic method or the triangulation method to detect the feedback light reflected by the surface of the ultraviolet curable resin 51. The feedback light detected by the reflective-light monitor unit 41 is used for, for example, adjusting the focus of the light beam emitted from the beam-scanning optical system 13 towards the ultraviolet curable resin 51. For example, based on the feedback light detected by the reflective-light monitor unit 41, the multiple lens elements included in the beam expander 34 may be driven so as to adjust the beam diameter, or a lens that adjusts the degree of collimation of the light beam transmitted through the beam expander 34 may be provided so as to adjust the beam diameter using this lens. Furthermore, the spatial light modulator 26 or the objective lens 15 may be shifted along the optical axis on the basis of the feedback light detected by the reflective-light monitor unit 41 so as to adjust the focus of the light whose image is to be formed on the ultraviolet curable resin 51 by one-shot exposure.

The polarization beam splitter 14 combines the light from the one-shot-exposure optical system 12 with the light beam from the beam-scanning optical system 13 and guides the combined light to the ultraviolet curable resin 51. The polarization beam splitter 14 is disposed such that the reflective-transmissive surface thereof coincides with the anterior focal point of the objective lens 15.

The objective lens 15 includes a lens group having one or more lenses. The objective lens 15 forms an image of the light from the one-shot-exposure optical system 12 on the surface of the ultraviolet curable resin 51, and also condenses the light beam released from the beam-scanning optical system 13.

Furthermore, the objective lens 15 is configured such that the light beam deflected by the galvano mirrors 37 and 38 in the beam-scanning optical system 13 can be scanned at a uniform rate over the surface of the ultraviolet curable resin 51, that is, scanned at a uniform scan-line rate on the surface of the ultraviolet curable resin 51.

For example, the objective lens 15 is a so-called fθ lens that has an image height Y proportional to an incident angle θ and that has a relationship (Y=f×θ) in which the image height Y is equal to a product of a focal length f and the incident angle θ. In other words, the fθ lens is designed such that the scanning rate of a light beam to be scanned is constantly fixed regardless of the incident position of the light beam on the lens. The use of this objective lens 15 can prevent the designed shape and the actual shape of a cured layer from being different from each other, which can occur due to variations in the scan-line rate, thereby achieving high-precision molding.

The work station 16 includes a container 52, a stage 53, and a driving unit 54.

The container 52 contains the ultraviolet curable resin 51 in the liquid state.

The stage 53 is immersed in the ultraviolet curable resin 51 contained in the container 52 and is shiftable in an orthogonal direction which is orthogonal to the surface, i.e., liquid surface, of the ultraviolet curable resin 51 (i.e., direction indicated by an arrow Z in FIG. 2) and also in a direction parallel to the liquid surface (i.e., X-Y direction that is orthogonal to the Z direction).

The driving unit 54 drives the container 52 and the stage 53 according to the control performed by the control unit 17. For example, the driving unit 54 shifts the stage 53 in the X-Y direction for each small work area (FIG. 1) subjected to exposure, and also shifts the stage 53 downward in the Z direction by a distance corresponding to the thickness of one cured layer (i.e., thickness d in FIGS. 2 and 4) in a step-by-step fashion every time one cured layer of the three-dimensional model is formed. Moreover, the driving unit 54 drives the container 52 in the orthogonal direction so that the surface of the ultraviolet curable resin 51 coincides with a posterior focal point of the objective lens 15.

The control unit 17 controls the light source 21 to turn on and off the emission of the light from the light source 21, controls the shutter 22 to turn on and off the exposure performed on the ultraviolet curable resin 51, and controls the driving unit 54 to drive the container 52 and the stage 53. Furthermore, the control unit 17 sends a driving signal, for driving the pixels in the spatial light modulator 26, to the spatial light modulator 26 on the basis of the cross-sectional-shape data of the three-dimensional model so as to allow the pixels of the spatial light modulator 26 that correspond to the exposure range to transmit light.

The cross-sectional-shape data of the three-dimensional model is divided into small-work-area data pieces for the respective small work areas (FIG. 1). Based on the patterns of the small-work-area data pieces, if there are small work areas having the same patterns successively in the stacking direction, the control unit 17 controls the individual units included in the optical molding apparatus 11 so that exposure is performed collectively on each of these small work areas.

An example of a three-dimensional model molded by performing exposure collectively on small work areas having the same patterns will be described with reference to FIG. 4.

FIG. 4 shows the three-dimensional model as viewed from the Y direction. This three-dimensional model includes four cured layers stacked in the Z direction. Each cured layer includes four tiles that are joined to each other in the X direction. One side of each tile extending in the X direction has a length L.

In the description below, each of the tiles will be expressed according to the position of the tile and the layer to which the tile belongs, where appropriate. For example, an m-th tile in an n-th cured layer will be referred to as a tile $T_{n,m}$. Specifically, the first cured layer includes tiles $T_{1,1}$ to $T_{1,4}$, the second cured layer includes tiles $T_{2,1}$ to $T_{2,4}$, the third cured layer includes tiles $T_{3,1}$ to $T_{3,4}$, and the fourth cured layer includes tiles $T_{4,1}$ to $T_{4,4}$.

The three-dimensional model in FIG. 4 has holes $P_1$ to $P_3$ that have the same diameter and extend in the Z direction.

The hole $P_1$ is provided in the tile $T_{1,1}$, the tile $T_{2,1}$, the tile $T_{3,1}$, and the tile $T_{4,1}$ and is formed so as to extend from the top surface to the bottom surface of the three-dimensional model. Specifically, the small-work-area data pieces for forming the tile $T_{1,1}$, the tile $T_{2,1}$, the tile $T_{3,1}$, and the tile $T_{4,1}$ have the same pattern in which a section corresponding to the hole $P_1$ is prevented from being exposed to light.

The hole $P_2$ is provided in the tile $T_{4,2}$ and is formed so as to extend from the top surface of the three-dimensional model to the boundary surface between the tile $T_{4,2}$ and the tile $T_{3,2}$. Specifically, the small-work-area data piece for forming the tile $T_{4,2}$ has a pattern in which a section corresponding to the hole $P_2$ is prevented from being exposed to light, whereas the small-work-area data pieces for forming the tile $T_{1,2}$, the tile $T_{2,2}$, and the tile $T_{3,2}$ have the same pattern that allows the entire surface to be exposed to light.

The hole $P_3$ is provided in the tile $T_{2,3}$, the tile $T_{3,3}$, and the tile $T_{4,3}$ and is formed so as to extend from the top surface of the three-dimensional model to the boundary surface between the tile $T_{2,3}$ and the tile $T_{1,3}$. Specifically, the small-work-area data pieces for forming the tile $T_{2,3}$, the tile $T_{3,3}$, and the tile $T_{4,3}$ have the same pattern in which a section corresponding to the hole $P_3$ is prevented from being exposed to light, whereas the small-work-area data piece for forming the tile $T_{1,3}$ has a pattern that allows the entire surface to be exposed to light.

The small-work-area data pieces for forming the tile $T_{1,4}$, the tile $T_{2,4}$, the tile $T_{3,4}$, and the tile $T_{4,4}$ have the same pattern that allows the entire surface to be exposed to light.

Accordingly, since the small-work-area data pieces for forming the tile $T_{1,1}$, the tile $T_{2,1}$, the tile $T_{3,1}$, and the tile $T_{4,1}$ have the same pattern, the tile $T_{1,1}$, the tile $T_{2,1}$, the tile $T_{3,1}$, and the tile $T_{4,1}$ can be formed collectively with a single exposure process by appropriately setting the exposure condition and adjusting the curing depth.

Likewise, due to the small-work-area data pieces having the same pattern, the tile $T_{1,2}$, the tile $T_{2,2}$, and the tile $T_{3,2}$ can be formed collectively by a single exposure process, the tile $T_{2,3}$, the tile $T_{3,3}$, and the tile $T_{4,3}$ can be formed collectively by a single exposure process, and the tile $T_{1,4}$, the tile $T_{2,4}$, the tile $T_{3,4}$, and the tile $T_{4,4}$ can be formed collectively by a single exposure process.

Accordingly, with regard to the three-dimensional model shown in FIG. 4, when the first layer is to be processed, the small work area for forming the tile $T_{1,3}$ is subjected to an exposure process (first exposure). When the third layer is to be processed, the small work area for forming the tile $T_{1,2}$, the tile $T_{2,2}$, and the tile $T_{3,2}$ is subjected to a single exposure process (second exposure).

When the fourth layer is to be processed, the small work area for forming the tile $T_{1,1}$, the tile $T_{2,1}$, the tile $T_{3,1}$, and the tile $T_{4,1}$ is subjected to a single exposure process (third exposure), the small work area for forming the tile $T_{4,2}$ is subjected to an exposure process (fourth exposure), the small work area for forming the tile $T_{2,3}$, the tile $T_{3,3}$, and the tile $T_{4,3}$ is subjected to a single exposure process (fifth exposure), and the small work area for forming the tile $T_{1,4}$, the tile $T_{2,4}$, the tile $T_{3,4}$, and the tile $T_{4,4}$ is subjected to a single exposure process (sixth exposure).

By performing exposure collectively on multiple layers of tiles in this manner, the number of exposure processes can be reduced. For example, if the three-dimensional model in FIG. 4 is to be molded by performing exposure individually on the 16 tiles included in the three-dimensional model, a total of 16 exposure processes will be necessary. However, by performing exposure collectively on multiple layers of tiles as in the above-described manner, the number of exposure processes can be reduced to 6 times.

When a three-dimensional model is to be molded by performing exposure collectively on a plurality of tiles, the emission time can be shortened by, for example, increasing the emission intensity, as compared to the emission time necessary when molding a three-dimensional model by performing exposure processes on a plurality of tiles in a layer-by-layer fashion. With the reduced number of exposure processes, the molding time for molding the three-dimensional model can be shortened.

FIG. 5 is a flow chart illustrating an optical molding process performed by the optical molding apparatus 11.

For example, when the optical molding apparatus 11 receives three-dimensional-shape data of a three-dimensional model created by CAD and starts performing optical molding, the control unit 17 executes a program for converting the three-dimensional-shape data of the three-dimensional model created by CAD to STL in step S11, whereby the three-dimensional-shape data of the three-dimensional model is converted to STL.

After step S11, the process proceeds to step S12 where the control unit 17 creates cross-sectional-shape data items from the STL-converted three-dimensional-shape data, and the process then proceeds to step S13. In addition, when creating the cross-sectional-shape data items of the three-dimensional model, for example, the position and the orientation of the three-dimensional model are determined in order to create data for molding a member that prevents the three-dimensional model from turning over during the molding process thereof.

In step S13, the control unit 17 divides each cross-sectional-shape data item created in step S12 so as to create small-work-area data pieces with respect to every cross-sectional-shape data item.

After step S13, the process proceeds to step S14 where the control unit 17 sets information n indicating the layer corresponding to a current cross-sectional-shape data item to 1 as an initial value and also sets information m indicating the position of a small work area in the current cross-sectional-shape data item to 1 as an initial value. The process then proceeds to step S15.

In step S15, the control unit 17 compares a pattern of an m-th small-work-area data piece in an n-th layer with a pattern of an m-th small-work-area data piece in an (n+1)th layer on the basis of, for example, path data of the individual patterns.

After step S15, the process proceeds to step S16 where the control unit 17 determines whether or not the pattern of the m-th small-work-area data piece in the n-th layer and the pattern of the m-th small-work-area data piece in the (n+1)th layer are the same on the basis of the comparison result obtained in step S15.

If the control unit 17 determines in step S16 that the pattern of the m-th small-work-area data piece in the n-th layer and the pattern of the m-th small-work-area data piece in the (n+1)th layer are the same, the process skips steps S17 to S20 so as to proceed to step S21. In this case, exposure is not yet performed on the small work area being processed.

On the other hand, if the control unit 17 determines in step S16 that the pattern of the m-th small-work-area data piece in the n-th layer and the pattern of the m-th small-work-area data piece in the (n+1)th layer are not the same, the process proceeds to step S17.

In step S17, the control unit 17 determines whether or not a position corresponding to the small work area being processed in an (n−1)th layer or lower is unexposed to light.

If the control unit 17 determines in step S17 that the position corresponding to the small work area being processed in the (n−1)th layer or lower is unexposed to light, the process proceeds to step S18. In that case, when the (n−1)th layer or lower is being processed, it is determined in step S16 that the patterns of the corresponding small-work-area data pieces are the same, and the small work area is not exposed to light yet. In other words, the patterns of the small-work-area data pieces of multiple layers are the same, and the ultraviolet curable resin 51 in the liquid (unexposed) state is present by an amount equivalent to multiple layers from the layer being processed and lower.

In step S18, exposure conditions for the one-shot-exposure optical system 12 and the beam-scanning optical system 13 are set in accordance with the number of layers of unexposed ultraviolet curable resin 51. The exposure condition for the one-shot-exposure optical system 12 includes, for example, the intensity of light to be emitted from the light source 21 and the emission time controlled by the shutter 22. The exposure condition for the beam-scanning optical system 13 includes, for example, the intensity and the emission time of light beam to be emitted from the light source 31, and the beam diameter controlled by the beam expander 34. Furthermore, in order to perform the molding process by performing exposure collectively on three layers of tiles, for example, the light intensity is set three times greater than that in the case where exposure is performed on one layer.

On the other hand, if the control unit 17 determines in step S17 that the position corresponding to the small work area being processed in the (n−1)th layer or lower is not unexposed to light, the process proceeds to step S19. In that case, a tile $T_{n-1,m}$ positioned one layer below a tile $T_{n,m}$ of the small work area being processed is already molded, and one layer's worth of the ultraviolet curable resin 51 in the liquid (unexposed) state is present above the tile $T_{n-1,m}$.

In step S19, the control unit 17 sets exposure conditions, for performing exposure on one layer's worth of the ultraviolet curable resin 51, in the one-shot-exposure optical system 12 and the beam-scanning optical system 13.

After step S18 or S19, the process proceeds to step S20 where the one-shot-exposure optical system 12 and the beam-scanning optical system 13 perform exposure on multiple layers in the small work area according to the exposure conditions set in step S18 or S19. For example, in the case where the exposure conditions are set in step S18 to perform exposure on multiple layers' worth of the ultraviolet curable resin 51, the one-shot-exposure optical system 12 and the beam-scanning optical system 13 perform exposure on the small work area according to the exposure conditions so as to mold multiple layers of tiles collectively.

After step S20, the process proceeds to step S21 where the control unit 17 determines whether or not exposure is performed on all of the small work areas in the n-th layer.

If the control unit 17 determines in step S21 that the exposure is not performed on all of the small work areas in the n-th layer, the process proceeds to step S22 where the control unit 17 increases the value of the information m, indicating the small-work-area position in the cross-sectional-shape data item, by 1. Then, the process returns to step S15 to process a small work area in the subsequent position, and the same steps are repeated.

On the other hand, if the control unit 17 determines in step S21 that the exposure is performed on all of the small work areas in the n-th layer, the process proceeds to step S23 where the control unit 17 determines whether or not exposure based on all of the cross-sectional-shape data items created in step S12 is performed.

If the control unit 17 determines in step S23 that the exposure based on all of the cross-sectional-shape data items is not performed, the process proceeds to step S24 where the control unit 17 increases the value of the information n indicating the layer corresponding to the current cross-sectional-shape data item by 1. Then, the process returns to step S15 to process a subsequent cured layer, and the same steps are repeated.

On the other hand, if the control unit 17 determines in step S23 that the exposure based on all of the cross-sectional-shape data items is performed, the three-dimensional model is completed and the process ends.

Accordingly, in the optical molding apparatus 11, when small-work-area data pieces of multiple successive layers in the stacking direction have the same pattern, the multiple layers of tiles are molded collectively in a single exposure process, whereby the molding time can be shortened as mentioned above with reference to FIG. 4.

With the use of the optical molding apparatus 11, prototypes for microchips, connectors, microcapsules, or other various fine components can be molded.

Although an fθ lens is used as the objective lens 15 in this embodiment, the objective lens 15 may alternatively be defined by a lens having a normal focusing function. In that case, the beam-scanning optical system 13 may be configured to control the rotational rate of the galvano mirrors 37 and 38 so as to allow a light beam to be scanned at a uniform scan-line rate. Furthermore, as a unit for scanning the light beam, polygon mirrors, for example, may be used as an alternative to the galvano mirrors 37 and 38.

Furthermore, as an alternative to the transmissive liquid crystal panel, the spatial light modulator 26 may include a digital micromirror device (DMD) having an array of reflective micromirrors, whose tilt angle is variable in accordance with an input signal, or a reflective liquid-crystal-on-silicon (LCOS) device. If a digital micromirror device is used, each micromirror corresponds to one unit area, and the one-shot-exposure optical system 12 does not have to be provided with the polarizing plate 23.

In the three-dimensional model shown in FIG. 4, the diameter of each hole to be formed is fixed. Alternatively, for example, the holes may be slightly tapered. In that case, depending on the molding accuracy, the same pattern may be used if the diameter of the hole in each layer is within a predetermined range, instead of providing a different pattern for each layer. Moreover, instead of performing exposure for each layer, the exposure may be performed on a predetermined number of layers that can be considered to be the same. In other words, with regard to a three-dimensional model that does not necessarily have to be molded with high accuracy, the molding time can be further shortened with a setting for determining whether or not the patterns are the same.

The determination process of whether or not the patterns of each small work area are the same can be automated by allowing the control unit 17 to make the determination on the basis of path data. Alternatively, for example, the user may view the patterns to make the determination. In that case, multiple layers of tiles set by the user are molded collectively by a single exposure process.

The small work areas do not necessarily have to be in the form of squares, and may have different dimensions in the X direction and the Y direction.

In addition to the optical molding apparatus 11 according to the present embodiment that performs optical molding based on a free liquid-surface technique in which the light spatially modulated by the spatial light modulator 26 is emitted from above the ultraviolet curable resin 51, an optical molding apparatus according to an alternative embodiment of the present invention may be configured to perform optical molding based on, for example, a restrained liquid-surface technique. Specifically, in this restrained liquid-surface technique, the light spatially modulated by the spatial light modulator 26 is emitted towards the boundary surface between the ultraviolet curable resin 51 and the container 52.

For example, the bottom surface of the container 52 may be made of a light transmissive material such as glass. In this case, the light spatially modulated by the spatial light modulator 26 is emitted from below the ultraviolet curable resin 51 towards the boundary surface between the glass and the ultraviolet curable resin 51. In other words, the surface of the ultraviolet curable resin 51 that receives light according to the cross-sectional-shape data of the three-dimensional model includes the boundary surface between the glass and the ultraviolet curable resin 51.

In the restrained liquid-surface technique, the stage 53 is disposed such that the distance between the container 52 and the stage 53 is set equal to the thickness of one cured layer. As each cured layer of the three-dimensional model is formed by emitting light to the ultraviolet curable resin 51 through the glass at the bottom surface of the container 52, the stage 53 is driven upward in the orthogonal direction until reaching the thickness of one cured layer. This driving process is repeated in a step-by-step fashion, whereby the three-dimensional model is molded.

In this manner, the surface (boundary surface) of the ultraviolet curable resin 51 receiving the light is restrained by the glass, whereby each cured layer can be accurately molded to a thickness of one layer. This can enhance the stacking accuracy so that the three-dimensional model can be formed with high accuracy.

The series of steps performed by the control unit 17 described above may be executed by hardware or by software. In the case where the series of steps is to be executed by software, a program constituting the software may be installed in a computer built in designated hardware or may be installed in, for example, a general-purpose personal computer, which can execute various functions based on various programs installed in the computer, via a program recording medium.

FIG. 6 is a block diagram illustrating a configuration example of hardware of a computer that executes the above-described series of steps in accordance with a program.

In the computer, a central processing unit (CPU) 101, a read-only memory (ROM) 102, and a random-access memory (RAM) 103 are mutually connected to one another via a bus 104.

The bus 104 is further connected to an input/output interface 105. The input/output interface 105 is connected to an input unit 106 including for example, a keyboard, a mouse, and a microphone, to an output unit 107 including, for example, a display and a speaker, to a storage unit 108 including, for example, a hard disk and a nonvolatile memory, to a communication unit 109 including, for example, a network interface, and to a drive 110 that drives a removable medium 111, such as a magnetic disc, an optical disc, a magneto-optical disc, or a semiconductor memory.

In the computer having the above-described configuration, the CPU 101 loads, for example, a program stored in the storage unit 108 into the RAM 103 via the input/output interface 105 and the bus 104 so as to execute the program, thereby performing the above-described series of steps.

The program to be executed by the computer, i.e., the CPU 101, is provided by, for example, being stored in the removable medium 111, which is a packaged medium such as a magnetic disc (including a flexible disc), an optical disc (compact-disc read-only memory (CD-ROM)), a digital versatile disc (DVD), a magneto-optical disc, or a semiconductor memory, or provided via a wired or wireless transmission medium such as a local area network, the Internet, or digital satellite broadcasting.

By loading the removable medium 111 into the drive 110, the program can be installed in the storage unit 108 via the input/output interface 105. Alternatively, the program can be received by the communication unit 109 via a wired or wireless transmission medium so as to be installed in the storage unit 108. As a further alternative, the program may be preliminarily installed in the ROM 102 or the storage unit 108.

The program executed by the computer may be a program that performs a process in a time-series fashion according to the order described in this specification or may be a program that performs a process in a parallel fashion or at a predetermined timing in response to an instruction. Furthermore, the program may be of a type that is processed by a single CPU or of a type that is processed distributively by a plurality of CPUs.

The embodiments of the present invention are not limited to the above-described embodiments, and various modifications are permissible to an extent that they do not depart from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical molding apparatus that molds an optically molded product by stacking cured layers, each cured layer being formed by emitting light according to cross-sectional-shape data of the optically molded product onto a surface of photo-curable resin, the optical molding apparatus comprising:

an exposing unit that performs exposure on the photo-curable resin for each of small work areas defined by dividing an overall work area into a plurality of smaller areas, the overall work area being an area on which an optical molding operation is performed; and an exposure control unit that controls the exposing unit, wherein the exposure control unit includes a processing unit configured to execute a program that causes the exposure control unit to control the exposing unit such that, for a predetermined small work area, multiple layers in the photo-curable resin are collectively exposed to light emitted to the photo-curable resin during the same exposure, wherein the multiple layers are multiple successive layers in a stacking direction, and the predetermined small work area has substantially the same exposure pattern for each of the multiple layers.

2. The optical molding apparatus of claim 1, wherein, when executed by the processing unit, the program causes the exposure control unit to control an exposure condition of the exposing unit according to a number of the multiple layers in the photo-curable resin that are to be collectively exposed to the light during the same exposure.

3. The optical molding apparatus of claim 2, wherein the exposure condition includes at least one of an intensity of the light emitted to the photo-curable resin and an emission time of the light emitted to the photo-curable resin, and the at least one of the intensity and the emission time is set according to the number of the multiple layers in the photo-curable resin that are to be collectively exposed to the light during the same exposure.

4. The optical molding apparatus of claim 1, wherein the program is stored in a storage unit coupled to the processing unit.

* * * * *